United States Patent

Engelhardt et al.

[11] Patent Number: 6,137,627
[45] Date of Patent: Oct. 24, 2000

[54] FINE FOCUSING TABLE

[75] Inventors: Johann Engelhardt, Bad Schönborn; Klaus Kierschke, Schriesheim, both of Germany

[73] Assignee: Leica Microsystems Heidelberg GmbH, Heidelberg, Germany

[21] Appl. No.: 09/242,120

[22] PCT Filed: Aug. 1, 1997

[86] PCT No.: PCT/DE97/01630

§ 371 Date: May 24, 1999

§ 102(e) Date: May 24, 1999

[87] PCT Pub. No.: WO98/08126

PCT Pub. Date: Feb. 26, 1998

[30] Foreign Application Priority Data

Aug. 23, 1996 [DE] Germany .......................... 196 34 000
Dec. 5, 1996 [DE] Germany .......................... 196 50 392

[51] Int. Cl.[7] .................................................. G02B 21/26
[52] U.S. Cl. ......................... 359/393; 359/391; 359/392
[58] Field of Search ....................... 359/368, 391–395, 359/819–830, 900

[56] References Cited

U.S. PATENT DOCUMENTS

| | | | |
|---|---|---|---|
| 3,407,018 | 10/1968 | Miller | 359/392 |
| 4,095,874 | 6/1978 | Wallace | 359/391 |
| 4,688,908 | 8/1987 | Moore | 359/393 |
| 5,323,712 | 6/1994 | Kikuiri | 359/391 |
| 5,864,389 | 1/1999 | Osanai et al. | 359/393 |

FOREIGN PATENT DOCUMENTS

| | | | |
|---|---|---|---|
| 202 105 | 11/1986 | European Pat. Off. | 359/392 |
| 0277675 | 8/1988 | European Pat. Off. | |
| 1552265 | 1/1969 | France . | |
| 3246358 | 6/1984 | Germany . | |
| 4232077 | 3/1994 | Germany . | |
| 5-181067 | 7/1993 | Japan | 359/392 |
| WO 9519552 | 7/1995 | WIPO . | |

*Primary Examiner*—Thong Nguyen
*Attorney, Agent, or Firm*—Simpson, Simpson & Snyder, L.L.P.

[57] ABSTRACT

A fine-focusing stage for microscopes, with an object carrier (1), a holder (2) for the object carrier (1) and a positioning mechanism (3) adjusting the support in its horizontal position. In order to achieve parallel vertical displacement of the object carrier (1) using simple methods of construction the invention is so designed that the holder (2) comprises a mounting portion (4) preferably for mounting on an object stage or on the microscope and a connecting portion (5) with the object carrier, and articulated parallel arms (8,9) through bending elements (6,7) extend between the mounting portion (4) and the connecting portion (5).

24 Claims, 1 Drawing Sheet

FINE FOCUSING TABLE

BACKGROUND OF THE INVENTION

The invention concerns a fine-focusing stage for microscopes, with an object carrier, a holder for the object carrier, and a positioning means which changes the vertical Z-axis position of the object carrier.

In ordinary microscopy, the object is focused by the microscope focusing drive. Positioning accuracy attainable with motors—usually DC motors—is about ±50 nm. Such values are inadequate, by a factor of more than two, so such focusing is not useful. External stepping motors are also often attached to the fine focusing drive of the microscope. By gearing down sufficiently, fine step divisions can be achieved; but the internal or external gearing needed very substantially limits movability.

Gear-free direct drives are already known in practice. Positioning accuracies in the nanometer range are attained with such direct drives. However, the range of motion is limited to a few hundred micrometers. There is the further problem here that such a direct drive, for instance, moves only one objective, which then projects far past the other objectives.

Z-stages which can be moved by piezoactive elements are also known in practice. However, the range of movement of such Z-stages is limited by the piezoelements. Piezo assemblies are also expensive because of the external measurement system required and because of the high-voltage control systems also needed.

Almost any desired Z scan rates can be attained with piezo control, including constant rapid and also very slot Z scan rates, such as 1000 $\mu$m per second to 0.01 $\mu$m per second. Speed tolerances less than ±0.5% can, in any case, be attained with geared motors only with extreme difficulty.

Now if a fine-adjustment stage is to be used in a conventional microscope, its design requires extreme flatness, with heights of about 5 mm desirable. Also, there must be a hole in the center of the stage for the light to pass through.

Z-stages with galvanometrically driven tilt plates have also been known in practice for some years. The disadvantage of such a system, though, is that the object is necessarily moved laterally as it is lifted, with large lift movements. If the object being observed is in the plane of the pivot of the tilt plate the error due to the lateral movement is negligibly small. For objects, or areas of objects, more distant from the plane of pivoting, though, this error becomes unacceptably large as the distance increases.

SUMMARY OF THE INVENTION

The invention is based on the objective of designing and developing a fine-focusing stage for microscopes of the type discussed here such that no error occurs even with large vertical movement of the object carrier. Furthermore, the fine-focusing stage should be simple in design and it should be possible to make it as thin as possible.

The fine-focusing stage according to the invention attains the objective above by being designed so that the holder comprises a mounting portion, preferably fastened to the microscope stage or to the microscope, and a connecting portion to the object carrier, and that hinged parallel arms extend between the mounting portion and the connecting portion through bending elements.

It is known according to the invention that adjustment errors which occur in the usual Z-stages can be avoided if the object carrier has a parallel lift characteristic. Therefore the holder has a mounting portion which can be attached rigidly to the holder. In the actual case, the mounting portion fastens either to the microscope stage or to the microscope itself. The holder also has a connecting portion to the object carrier, so that the object carrier is effectively connected to the mounting portion. Parallel arms hinged at bending elements extend between the mounting portion and the connecting portion, so that the bending elements occur between the mounting portion and the parallel arms, and also between the parallel arms or the connecting portion and the microscope stage.

The characteristic claimed here always assures that the horizontal position of the microscope stage does not change as it moved upward or downward, that is, that the object carrier has a parallel lift characteristic. It is of very special importance in this respect that the mounting portion of the holder is in a fixed position and that the parallel arms are a connection between the horizontal object carrier and the mounting portion, where the bending elements make it possible for the parallel arms to bend with respect to the object carrier and with respect to the mounting portion. Finally, the tilt error of the object carrier in the usual Z-stages is compensated by the hinging to the object carrier by means of parallel arms and through defined bending elements.

BRIEF DESCRIPTION OF THE DRAWINGS

Now there are various ways advantageously to embody and develop the teaching of this invention. One must refer to the following explanation of one embodiment of the invention, using the drawing. In combination with explaining the preferred example embodiment of the invention, the generally preferred embodiments and developments of the teaching are explained. The drawing shows.

DETAILED DESCRIPTION OF THE PREFERRED EMBODIMENTS

Figure 1:
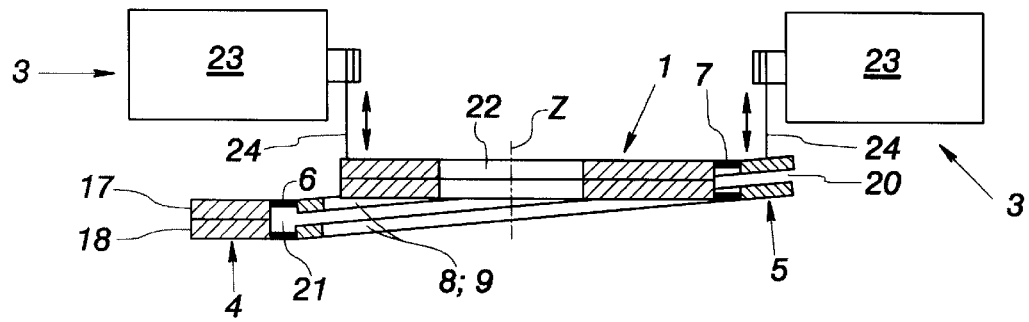
FIG. 1: a schematic lateral view, sectional along the line I—I of FIG. 2, showing an example embodiment of a fine-focusing stage according to the invention.
Figure 2:
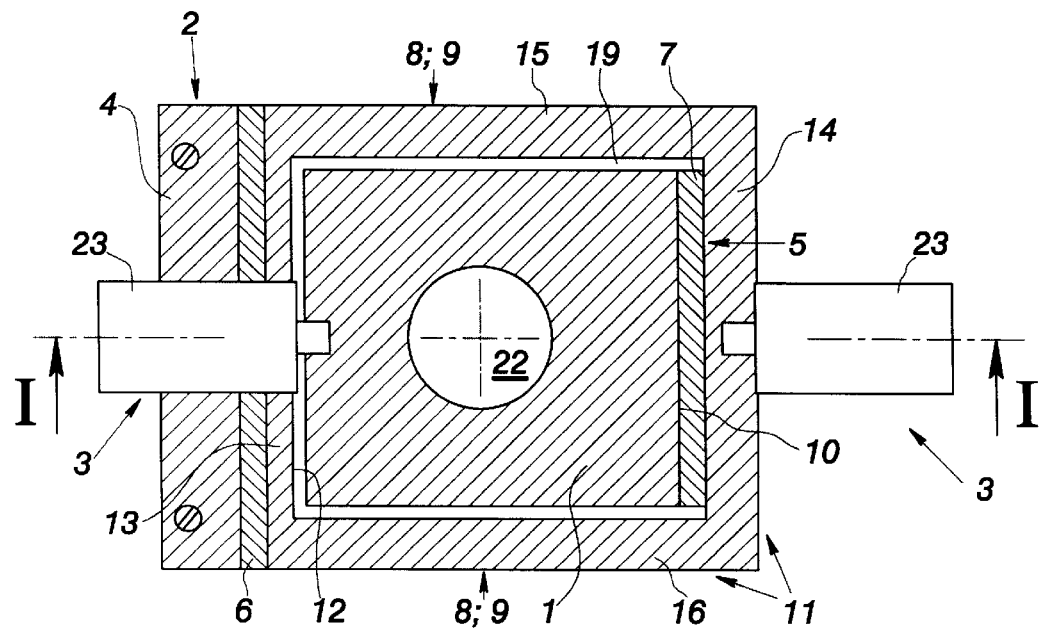
FIG. 2: the item of FIG. 1 in a plan view, with two alternative positioning means shown.

FIGS. 1 and 2 together show one example embodiment of a microscope fine-focusing stage. For simplicity, only the fine-focusing stage itself is shown here. The fine-focusing stage comprises an object carrier 1, a holder 2 for the object carrier 1, and a positioning means 3 which changes the vertical Z-axis position of the object carrier 1.

According to the invention, holder 2 includes a mounting portion 4, used preferably for mounting to an object stage not shown here or to the microscope—between the microscope and the objective lens. The holder 2 also comprises a connection portion 5 to the object carrier 1, such that parallel arms, 8, 9 extend between the mounting portion 4 and the connecting portion 5 through bending elements 6, 7.

FIG. 2 shows particularly clearly that the object carrier 1 is designed as a rectangle, and is connected to the parallel arms 8, 9 through the bending element 7 and the connecting portion 5. The bending element 7 extends parallel to the connecting edge 10 of object carrier 1.

FIG. 2 also shows that the holder 2 is designed in the form of a frame 11 surrounding the object carrier 1. The frame 11 is also rectangular. The object carrier 1 is slightly separated from the surrounding frame 11, with the connecting edge 10 or the connecting region 5 on the side of object carrier 1 opposite the mounting portion 4. Furthermore, the bending element 6 runs between the mounting portion 4 and the parallel arms 8, 9, parallel to the internal edge 12 of frame 11 nearest mounting portion 4, such that the edge 12 is consequently parallel to the connecting edge 10.

The fine-focusing stage shown in FIGS. 1 and 2 is further designed so that two opposite frame legs 13, 14 are attached to the mounting portion 4 and the connecting portion 5 through the bending elements 6, 7, and so that the other two mutually opposite frame legs 15, 16 each comprise one parallel arm 8, 9.

In the actual design, the object carrier and the holder 2 comprise two superimposed identical plates 18, 18, partially firmly connected together, as can be seen particularly well from FIG. 1. These plates 17, 18 have spaces 19 which pas through and form three edges of the object carrier 1. Furthermore, a smaller thickness giving separation is provided in plates 17, 18 in the vicinity of the frame 11 on the sides of plates 17, 18 which face each other, so that there is a space 20 between the frame legs 13, 14, 15 and 16. Recesses 21 are also provided on the sides of plates 17, 18 which face each other. Those, finally, define the bending elements 6, 7, with the minimum remaining wall thickness to achieve bending.

FIG. 1 also shows that the holder 2 and the object carrier 1 have the same thickness, a total thickness of about 6 mm being provided here.

According to the presentation in FIG. 2, the object carrier 1 has a passage 22 for the light beam in about its middle.

Two alternative arrangements for the positioning means 3 are shown in FIG. 2 of the selected example embodiment. As shown in the drawing of FIG. 1, the positioning means 3 attaches directly to the object carrier, on the side opposite the connecting portion 5. As shown by the drawing in FIG. 2, the positioning means either attaches directly to the object carrier 1 or to the frame leg 14 of the mounting portion 4. Whatever the actual arrangement, a cord 24 acts between the object carrier 1 or the frame 11 and the galvanometer drive 23 for the positioning means 3, using a galvanometer drive 23.

With respect to an actual design of object carrier 1, it is advantageous for it to be designed as a rectangle and for the object carrier to be connected, in the vicinity of its edges, specifically in the vicinity of the connecting edges 10, with the parallel arms 8, 9 through bending element 7 and connecting portion 5. A rectangular design of the object carrier offers a very significant advantage both with respect to the production engineering and with respect to a back-and-forth scan of objects.

The bending element 7 for object carrier 1 can be parallel to the connecting edge 10 of the object carrier. Finally, this bending element 7 is parallel to the opposing open edge of the object carrier, so that this bending element acts as a hinge for the object carrier.

It is also advantageous, from the viewpoint of production engineering, for the holder 2 to be made in the form of a frame 11 surrounding the object carrier 1. Frame 11 can also be made rectangular, corresponding to the shape of object carrier 1. The object carrier 1 could be at least slightly separated from the surrounding frame, so that the connecting edge 10 or the connection portion 5 of the object carrier lies on the side of the mounting portion 4 of the holder 2 opposite to the object carrier. In any case, the object carrier in the form under discussion here is quasi-integrated into the frame 11 and can be forced out of the plane of the frame, at which time the parallel arms 8, 9 are allowed to pivot at the bending elements.

The bending element 6 between the mounting portion 4 and the parallel arms 8, 9 could run parallel to the edge of the frame toward the mounting portion. That would assure that all the edges of the object carrier 1 run parallel to the edges of the holder 2 or of the frame 11. Then the bending elements would also be directed parallel to the edges of the frame and of the object carrier.

In a further advantageous manner, two opposite legs 13, 14 of the frame 11 are connected through the bending elements 6 and 7 to the mounting portion 4 and the connecting portion 5, respectively, so that the other two opposing legs 15, 16 of the frame each comprise two parallel arms 8, 9. Finally, the frame 11 comprises a total of four frame legs. Two opposite frame legs 13, 14 are connected to the mounting portion 4 on one hand and to the connecting portion 5 on the other hand. The other two frame legs 15, 16, which are also opposite each other, make up the parallel arms 8, 9, so that each parallel arm—on each side—is made double, and so that the parallel arms are parallel to each other at a distance shift with respect to each other during the lifting movement of the object carrier 1, corresponding to the excursion, or corresponding to the lift of the object carrier. That, again, is due to the thickness of the frame 11 and the design of the bending elements.

In a specific case, the object carrier 1 and the holder 2 could be made of two identical plates, one above the other, firmly connected to each other. The plates have cutouts or passages 19 going through the plates to form three adjacent edges of the object carrier. In the vicinity of the frame and in the vicinity of the bending elements they have, likewise, thin cutouts of reduced thickness or recesses 21 on the matching sides of the plates, providing separation.

The lesser thickness in the vicinity of the frame leads to a mutual separation of the frame legs for the individual plates, so that relative motion or shifting is possible between the parts of the frame legs in case of a lifting movement of the object carrier. The cutouts or recesses in the vicinity of the bending elements define the ending elements and are designed in a further advantageous manner such that the remaining thickness of the material—toward the surfaces of the individual plates—assures long term resistance of the plates to bending.

In any case, the design described above leads to the plates being firmly connected together only in the vicinity of the object carrier 1 and the mounting portion 4. It also results in the reduced thickness in the frame area, on one hand, and the cutouts or recesses in the vicinity of the bending elements, on the other hand, thereby separating the plates. In case of deflection of the object carrier or of the frame area or connecting portion turned toward or opposite to the mounting portion, parallel lifting of the object carrier is possible.

According to the actual embodiment above, it is possible for the holder 2 and the object carrier 1 to have the same thickness, so that a flat form of the fine-focusing stage can be accomplished. The thickness of the holder 2 and the object carrier 1 can, without further discussion, be in the range from less than 5 mm to about 10 mm.

It is also possible to provide a passage 22 in about the center of the object carrier 1 for the light beam to pass, as in use as a stage i transmitted light microscopy, or for use directly on the objective lens. The size of this passage is based on the requirements of the particular case.

The object carrier 1 and the holder 2 can be made of stainless steel or aluminum, for example. In both cases, simple metal-cutting work is possible. It would also be conceivable to produce the individual parts of the fine-focusing stage—the two plates making up the fine-focusing stage—by injection molding. The cutouts and recesses could be provided by the mold. Otherwise, a milling process and subsequent assembly of the individual plates would be required.

With respect to the positioning means 3 mentioned initially, it would be advantageous, in view of a particular simple design, for the positioning means to attach directly to the object carrier 1, preferably on the open side opposite the connecting portion 5. Finally, the object carrier here could be forced upward or downward, accomplishing a parallel lift of the object carrier. It would, similarly, be conceivable to attach the positioning means on the frame leg 14 for the connection portion 5, so that an appropriate upward or downward force would also give a parallel lift for the object carrier.

Ordinary means are used as drives for the positioning means 3. A single or multiple stage drive can be provided advantageously for the coarse and fine movement of the object carrier 1. For very specially accurate and reproducible adjustment of the focus, one could provide a galvanometer drive 23 with a cord 24 running between the frame 11 or the object carrier 1 and the galvanometer drive. The object carrier and/or the frame could be pulled or moved directly upward or downward, depending on the arrangement of the galvanometer drive, so as to accomplish a parallel lift of the object carrier.

With respect to potential applications of the fine-focusing stage, it must be noted particularly at this point that the fine-focusing stage can be incorporated as an intermediate unit between the microscope and the objective lens or the objective nosepiece. It is also possible to fasten the fine-focusing stage with its holder to the microscope object stage, so that the focus position of the object can be adjusted extremely finely. In any case, the fine-focusing stage according to the invention can provide rapid and precise adjustment of the focus in confocal microscopy, corresponding to a definite requirement for confocal microscopy.

List of reference numbers
1 Object carrier
2 Holder for the object carrier
3 Positioning means
4 Mounting portion
5 Connecting portion
6 Bending element
7 Bending element
8 Parallel arm
9 Parallel arm
10 Connecting edge
11 Frame
12 Edge of the frame
13 Frame leg
14 Frame leg
15 Frame leg
16 Frame leg
17 Plate
18 Plate
19 Cutout
20 Space
21 Cutout
22 Passage
23 Galvanometer drive
24 Cord

What is claimed is:

1. A fine-focusing stage for a microscope comprising:
a holder including a mounting portion adapted for attachment to a microscope, a connecting portion opposite said mounting portion, and a pair of parallel arms extending between said mounting portion and said connecting portion, said pair of parallel arms being connected to said mounting portion by a bending element for permitting bending between said pair of parallel arms and said mounting portion;
an object carrier connected to said connecting portion of said holder by a second bending element for permitting bending between said object carrier and said connecting portion, said object carrier having a free edge opposite said second bending element extending parallel to bending lines defined by said first and second bending elements; and
positioning means for moving said object carrier in along a vertical Z-axis.

2. The fine-focusing stage according to claim 1, wherein object carrier is in the shape of a rectangle.

3. The fine-focusing stage according to claim 2, wherein said holder is a frame surrounding said object carrier.

4. The fine-focusing stage according to claim 3, wherein said frame is in the shape of a rectangle.

5. The fine-focusing stage according to claim 4, wherein said frame includes an internal edge nearest said mounting portion, and said bending lines are parallel to said internal edge.

6. The fine-focusing stage according to claim 4, wherein said frame includes two parallel frame legs, each of said frame legs having a pair of said parallel arms extending between said mounting portion and said connecting portion.

7. The fine-focusing stage according to claim 4, wherein said object carrier and said holder are made of two identical superimposed plates fixed together at said mounting portion.

8. The fine-focusing stage according to claim 7, wherein cut-out gaps are provided through said plates to separate said object carrier from said holder along three adjacent edges of said object carrier, and said plates are of reduced thickness on facing sides of said plates in the vicinity of said frame to provide separation between said pair of parallel arms.

9. The fine-focusing stage according to claim 7, wherein said first and second bending elements are defined by cut-out channels reducing the thickness of said plates.

10. The fine-focusing stage according to claim 1, wherein said holder is a frame surrounding said object carrier.

11. The fine-focusing stage according to claim 10, wherein said free edge of said object carrier and said mounting portion are on a same side of said stage.

12. The fine-focusing stage according to claim 10, wherein said positioning means includes a galvanometer drive having a cord acting between said frame and said galvanometer drive.

13. The fine-focusing stage according to claim 1, wherein said object carrier and said holder are made of two identical superimposed plates fixed together at said mounting portion.

14. The fine-focusing stage according to claim 1, wherein said holder and said object carrier have a same thickness.

15. The fine-focusing stage according to claim 14, wherein said thickness is in a range from 5 mm to 10 mm.

16. The fine-focusing stage according to claim 1, wherein said object carrier includes a centrally located passage therethrough for transmitting light.

17. The fine-focusing stage according to claim 1, wherein said holder and said object carrier are made of stainless steel.

18. The fine-focusing stage according to claim 1, wherein said holder and said object carrier are made of aluminum.

19. The fine-focusing stage according to claim 1, wherein said positioning means is attached to said object carrier.

20. The fine-focusing stage according to claim 19, wherein said positioning means is attached to said object carrier at a location remotely of said second bending element.

21. The fine-focusing stage according to claim 1, wherein said positioning means is attached to said connecting portion.

22. The fine-focusing stage according to claim 1, wherein said mounting portion is adapted for attachment to an object stage of a microscope.

23. The fine-focusing stage according to claim 1, wherein said positioning means includes a drive having at least two stages for respective coarse and fine movement of said object carrier.

24. The fine-focusing stage according to claim 1, wherein said positioning means includes a galvanometer drive having a cord acting between said object carrier and said galvanometer drive.

* * * * *